(12) United States Patent
Kahn et al.

(10) Patent No.: US 12,170,623 B2
(45) Date of Patent: Dec. 17, 2024

(54) DETERMINISTIC QUALITY OF SERVICE

(71) Applicant: Nokia Technologies Oy, Espoo (FI)

(72) Inventors: Colin Kahn, Morris Plains, NJ (US); Devaki Chandramouli, Plano, TX (US)

(73) Assignee: NOKIA TECHNOLOGIES OY, Espoo (FI)

( * ) Notice: Subject to any disclaimer, the term of this patent is extended or adjusted under 35 U.S.C. 154(b) by 356 days.

(21) Appl. No.: 17/758,327

(22) PCT Filed: Nov. 20, 2020

(86) PCT No.: PCT/IB2020/060987
§ 371 (c)(1),
(2) Date: Jul. 1, 2022

(87) PCT Pub. No.: WO2021/137039
PCT Pub. Date: Jul. 8, 2021

(65) Prior Publication Data
US 2023/0042506 A1  Feb. 9, 2023

Related U.S. Application Data

(60) Provisional application No. 62/957,151, filed on Jan. 4, 2020.

(51) Int. Cl.
*H04L 47/283* (2022.01)
*H04L 47/32* (2022.01)
*H04W 28/02* (2009.01)
*H04W 28/12* (2009.01)

(52) U.S. Cl.
CPC ............ *H04L 47/283* (2013.01); *H04L 47/32* (2013.01); *H04W 28/0278* (2013.01); *H04W 28/12* (2013.01)

(58) Field of Classification Search
CPC ....... H04L 47/32; H04L 47/283; H04L 47/30; H04W 28/0278; H04W 28/12
See application file for complete search history.

(56) References Cited

PUBLICATIONS

"IEEE 802.1Q", Wikipedia, Retrieved on Jul. 5, 2022, Webpage available at : https://en.wikipedia.org/wiki/IEEE_802.1Q.
"3rd Generation Partnership Project; Technical Specification Group Services and System Aspects; Service requirements for cyber-physical control applications in vertical domains; Stage 1 (Release 17)", 3GPP TS 22.104, V17.1.0, Sep. 2019, pp. 1-67.
"TSN—QoS", SA WG2 Meeting #136-AH, S2-191xxxx, Agenda: 6.x.x, Nokia, Jan. 13-17, 2020, pp. 1-4.
"3rd Generation Partnership Project; Technical Specification Group Services and System Aspects; System architecture for the 5G System (5GS); Stage 2 (Release 16)", 3GPP TS 23.501, V16.3.0, Dec. 2019, pp. 1-417.

(Continued)

*Primary Examiner* — Mandish K Randhawa
(74) *Attorney, Agent, or Firm* — Robert P. Michal, Esq.; Carter, DeLuca & Farrell LLP

(57) ABSTRACT

According to a first embodiment, a method may include receiving at least one time sensitive communications (TSC) request from at least one application function (AF). The method may further include determining at least one hold and forward (HnF) parameter based on the at least one TSC request. The method may further include transmitting the at least one HnF parameter to at least one user equipment (UE).

10 Claims, 7 Drawing Sheets

(56) References Cited

PUBLICATIONS

International Search Report and Written Opinion received for corresponding Patent Cooperation Treaty Application No. PCT/IB2020/060987, dated Feb. 5, 2021, 17 pages.
"TSN—QoS Framework Solution Update", ISA WG2 Meeting #129bis, S2-1811831, Agenda: 6.15.2, Nokia, Nov. 26-30, 2018, pp. 1-7.
"Introducing support for UE and UPF Residence Time for TSC Deterministic QoS", SA WG2 Meeting #132, S2-1903654, Nokia, Apr. 8-12, 2019, 4 pages.
"Discussion on time conversion between TSN clock and 5GS clock", SA WG2 Meeting #S2-136, S2-1911909, Agenda: 7.7.2, ZTE, Nov. 18-22, 2019, pp. 1-3.
"TSN QoS and traffic scheduling in 5GS", 3GPP TSG-SA WG2 Meeting #130, S2-1900609, Ericsson, Jan. 21-25, 2019, 9 pages.
"Complete hold and forward buffering mechanism", 3GPP TSG-WG SA2 Meeting #136, S2-1911750, Huawei, Nov. 18-22, 2019, 4 pages.
"Addressing Editor's notes on TSN", 3GPP TSG-SA2 Meeting #133, S2-1906754, Qualcomm Incorporated, May 13-17, 2019, 12 pages.
"KI#3A: New Sol: Solution for Synchronizing Hold and Forward Buffers and RAN with Burst Arrival", SA WG2 Meeting #140E, S2-2005739, Agenda: 8.5, Nokia, Aug. 19-Sep. 2, 2020, 5 pages.
"AF Support for TSC QoS", SA WG2 Meeting #143e, S2-2100663, Nokia, Feb. 24-Mar. 9, 2021, pp. 1-16.
"KI#3A exposure of deterministic QoS", 3GPP TSG-WG SA2 Meeting #144E e-meeting, S2-2102406, Huawei, Apr. 12-16, 2021, 4 pages.
"3rd Generation Partnership Project; Technical Specification Group Services and System Aspects; Study on XR (Extended Reality) and media services (Release 18)", 3GPP TR 23.700-60, V0.3.0, May 2022, pp. 1-218.
"KI#4 & K#5: Update of Solution 25", 3GPP TSG-SA WG2#151E e-meeting, S2-2204700r01, Agenda: 9.19, Qualcomm Incorporated, May 16-20, 2022, pp. 1-10.

DETERMINISTIC QUALITY OF SERVICE

CROSS REFERENCE TO RELATED APPLICATION

This application is a national phase entry application of PCT/IB2020/060987 filed Nov. 20, 2020, which claims the benefit of U.S. Provisional Application No. 62/957,151, filed Jan. 4, 2020. The entire content of the above-referenced applications are hereby incorporated by reference.

TECHNICAL FIELD

Various communication systems may benefit from improved data buffers, for example, hold and forward buffers.

BACKGROUND

A fifth generation (5G) radio access network (RAN) may utilize time-sensitive networking (TSN) as defined under Institute of Electrical and Electronics Engineers (IEEE) standard 802.1Q (also known as Dot1q) to enable deterministic messaging. As described in 802.1Qcc, TSN supports three models for user/network configuration: a fully centralized model, a centralized network/distributed user model, and a fully distributed model. The fully centralized and centralized network/distributed user models use a centralized management scheme to support real-time applications with time-sensitive communication flows between various devices, with each flow including strict timing requirements. TSN bridges may be configured to transmit and receive Ethernet frames of a TSN flow according to the strict scheduling requirements of the flow.

TSN may utilize at least one centralized network controller (CNC) as a proxy for the entire network with the aforementioned TSN bridges and communication flows. CNCs may regulate the transmission schedules of TSN frames, with a centralized user configuration providing communication between the CNC and each end device. The application operating the centralized user configuration may submit specific flow requirement requests to the CNC on behalf of the real-time applications.

SUMMARY

In accordance with some embodiments, a method may include receiving at least one time sensitive communications (TSC) request from at least one application function (AF). The method may further include determining at least one hold and forward (HnF) parameter based on the at least one TSC request. The method may further include transmitting the at least one HnF parameter to at least one user equipment (UE) or at least one user plane function (UPF).

In accordance with certain embodiments, an apparatus may include means for receiving at least one time sensitive communications (TSC) request from at least one application function (AF). The apparatus may further include means for determining at least one hold and forward (HnF) parameter based on the at least one TSC request. The apparatus may further include means for transmitting the at least one HnF parameter to at least one user equipment (UE) or at least one user plane function (UPF).

In accordance with various embodiments, an apparatus may include at least one processor and at least one memory including computer program code. The at least one memory and the computer program code may be configured to, with the at least one processor, cause the apparatus to at least receive at least one time sensitive communications (TSC) request from at least one application function (AF). The at least one memory and the computer program code may be further configured to, with the at least one processor, cause the apparatus to at least determine at least one hold and forward (HnF) parameter based on the at least one TSC request. The at least one memory and the computer program code may be further configured to, with the at least one processor, cause the apparatus to at least transmit the at least one HnF parameter to at least one user equipment (UE) or at least one user plane function (UPF).

In accordance with some embodiments, a non-transitory computer readable medium may be encoded with instructions that may, when executed in hardware, perform a method. The method may include receiving at least one time sensitive communications (TSC) request from at least one application function (AF). The method may further include determining at least one hold and forward (HnF) parameter based on the at least one TSC request. The method may further include transmitting the at least one HnF parameter to at least one user equipment (UE) or at least one user plane function (UPF).

In accordance with certain embodiments, a computer program product may perform a method. The method may include receiving at least one time sensitive communications (TSC) request from at least one application function (AF). The method may further include determining at least one hold and forward (HnF) parameter based on the at least one TSC request. The method may further include transmitting the at least one HnF parameter to at least one user equipment (UE) or at least one user plane function (UPF).

In accordance with various embodiments, an apparatus may include circuitry configured to receive at least one time sensitive communications (TSC) request from at least one application function (AF). The circuitry may further be configured to determine at least one hold and forward (HnF) parameter based on the at least one TSC request. The circuitry may further be configured to transmit the at least one HnF parameter to at least one user equipment (UE) or at least one user plane function (UPF).

In accordance with some embodiments, a method may include transmitting one or more of at least one residence time associated with the UE and at least one wired transmission rate R of the UE to at least one core. The method may further include receiving at least one HnF parameter from the core. The method may further include establishing at least one periodic deterministic data stream.

In accordance with certain embodiments, an apparatus may include means for transmitting one or more of at least one residence time associated with the UE and at least one wired transmission rate R of the UE to at least one core. The apparatus may further include means for receiving at least one HnF parameter from the core. The apparatus may further include means for establishing at least one periodic deterministic data stream.

In accordance with various embodiments, an apparatus may include at least one processor and at least one memory including computer program code. The at least one memory and the computer program code may be configured to, with the at least one processor, cause the apparatus to at least transmit one or more of at least one residence time associated with the UE and at least one wired transmission rate R of the UE to at least one core. The at least one memory and the computer program code may be further configured to, with the at least one processor, cause the apparatus to at least receive at least one HnF parameter from the core. The at least one memory and the computer program code may be further configured to, with the at least one processor, cause the apparatus to at least establish at least one periodic deterministic data stream.

In accordance with some embodiments, a non-transitory computer readable medium may be encoded with instructions that may, when executed in hardware, perform a method. The method may include transmitting one or more of at least one residence time associated with the UE and at least one wired transmission rate R of the UE to at least one core. The method may further include receiving at least one HnF parameter from the core. The method may further include establishing at least one periodic deterministic data stream.

In accordance with certain embodiments, a computer program product may perform a method. The method may include transmitting one or more of at least one residence time associated with the UE and at least one wired transmission rate R of the UE to at least one core. The method may further include receiving at least one HnF parameter from the core. The method may further include establishing at least one periodic deterministic data stream.

In accordance with various embodiments, an apparatus may include circuitry configured to transmit one or more of at least one residence time associated with the UE and at least one wired transmission rate R of the UE to at least one core. The circuitry may further be configured to receive at least one HnF parameter from the core. The circuitry may further be configured to establish at least one periodic deterministic data stream.

In accordance with some embodiments, a method may include receiving at least one HnF UPF parameter from at least one core. The method may further include establishing at least one periodic deterministic data stream. The method may further include transmitting at least one periodic open/close cycle beginning at at least one HnF_First_Open_Time.

In accordance with certain embodiments, an apparatus may include means for receiving at least one HnF UPF parameter from at least one core. The apparatus may further include means for establishing at least one periodic deterministic data stream. The apparatus may further include means for transmitting at least one periodic open/close cycle beginning at at least one HnF_First_Open_Time.

In accordance with various embodiments, an apparatus may include at least one processor and at least one memory including computer program code. The at least one memory and the computer program code may be configured to, with the at least one processor, cause the apparatus to at least receive at least one HnF UPF parameter from at least one core. The at least one memory and the computer program code may be further configured to, with the at least one processor, cause the apparatus to at least establish at least one periodic deterministic data stream. The at least one memory and the computer program code may be further configured to, with the at least one processor, cause the apparatus to at least transmit at least one periodic open/close cycle beginning at at least one HnF_First_Open_Time.

In accordance with some embodiments, a non-transitory computer readable medium may be encoded with instructions that may, when executed in hardware, perform a method. The method may include receiving at least one HnF UPF parameter from at least one core. The method may further include establishing at least one periodic deterministic data stream. The method may further include transmitting at least one periodic open/close cycle beginning at at least one HnF_First_Open_Time.

In accordance with certain embodiments, a computer program product may perform a method. The method may include receiving at least one HnF UPF parameter from at least one core. The method may further include establishing at least one periodic deterministic data stream. The method may further include transmitting at least one periodic open/close cycle beginning at at least one HnF_First_Open_Time.

In accordance with various embodiments, an apparatus may include circuitry configured to receive at least one HnF UPF parameter from at least one core. The circuitry may further be configured to establish at least one periodic deterministic data stream. The circuitry may further be configured to transmit at least one periodic open/close cycle beginning at at least one HnF_First_Open_Time.

BRIEF DESCRIPTION OF THE DRAWINGS

For proper understanding of this disclosure, reference should be made to the accompanying drawings, wherein.

DETAILED DESCRIPTION

Figure 1:
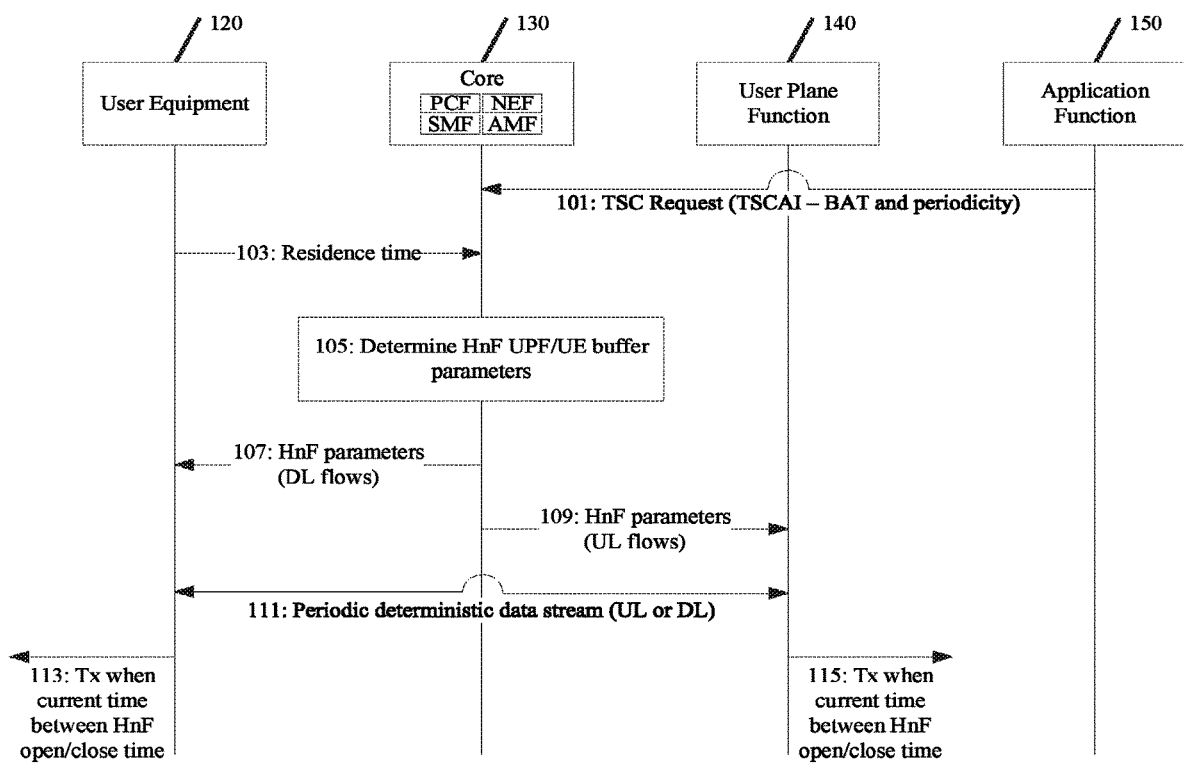
FIG. 1 illustrates an example of a signaling diagram according to certain embodiments.

Third Generation Partnership Project (3GPP) release 16 (Rel-16) includes a focus to ensure that time sensitive communications (TSC) have seamless integration of its fifth generation system (5GS) into industrial applications in accordance with TSN-capable infrastructure, as discussed above, with 5GS serving as an Ethernet bridge within the TSN network. However, 3GPP Rel-16 only supports a fully-centralized TSN configuration, with the 5GS and other bridges reporting port capabilities to the CNC, for example, line rate and bridge delay.

In response, CNCs configure bridges between transmitters and receivers, including the 5GS bridge, according to information received about end user requirements, for example, as received from a centralized user configuration (CUC) described in 802.1Qcc, and network topology information provided by each bridge. The CNC may configure streams between end users transmitting at predetermined times, where bridges between a transmitter and receiver may be configured according to a known flow timing scheme at each hop. In addition, gate schedulers at each bridge egress port may indicate precise intervals when resources should be reserved for the periodic, deterministic traffic, according to IEEE 802.1Qbv and 802.1Qci. CNCs may also configure end users requiring deterministic delays, which may be within a predefined window, according to IEEE 802.1Qcc and 802.1Q supporting deterministic delays where priority is given to designated traffic.

3GPP Rel-16 defines several new functions for 5GS bridges, including a device-side TSN translator (DS-TT) associated with user equipment (UE), as well as a network-side TSN translator (NW-TT) associated with the user plane function (UPF). These translators may serve as bridge ports, and support IEEE protocols, including gate scheduling for traffic with end-stations that periodically transmit at predetermined times. For example, gate scheduling may be configured on the UPF/NW-TT and/or UE/DS-TT using IEEE-managed objects, which may be provided by the CNC and specified by IEEE protocols 802.1Qbv and 802.1Qci. In 3GPP Rel-16, port scheduling provided by IEEE protocols may be translated to a burst arrival time (BAT) and periodicity at the 5G air interface, and sent to the RAN as time sensitive communications assistance information (TSCAI) parameters. The RAN may then use these parameters to optimize scheduling over the 3GPP air interface.

In order to accommodate delay variations for a TSC packet being transmitted in the 5GS, 3GPP defines hold and forward (HnF) buffers in the UE/DS-TT and UPF/NW-TT. These buffers ensure that TSC packets are transmitted from the UE/DS-TT to downstream bridges/end-stations within the window proscribed by 802.1Qbv/802.1Qci schedules. Packets arriving early at the UE (downstream) or UPF (upstream) will be held in the HnF buffer until an appropriate transmission window.

In 3GPP Rel-17, SA2 address industrial internet of things (IIoT) for exposing deterministic QoS, as discussed in 3GPP technical report (TR) 23.700, wherein TSC may be supported without depending on IEEE protocols and without configuring the 5GS as a TSN bridge. When the deterministic nature of the traffic is identified by an application function (AF), the AF may request TSC services from the 5GS. Such requests may support scenarios unsupported by 3GPP Rel-16, such as where IP networking and 5GS IP PDU sessions, rather than Ethernet, are used, leaving the 5GS unable to be configured as a bridge. Another unsupported example occurs when no external TSN network nor CNC exists to provide gate schedules. As a result, the data network (DN) may contain 802.1Q bridges without support for IEEE TSN protocols, such as 802.1Qbv, 802.1Qci, and 802.1Qcc. Finally, a lack of support may occur when the 5GS provides connectivity between endpoints without a DN, such as for UE-UE streams and/or UE to wired endpoints where the endpoint has an interface to the UPF.

The scenarios described above may occur with a large number of applications when wired bridge delays, which may be in microseconds, need not be optimized, yet the delay of the 5GS, with a URLLC delay of milliseconds, would need to be minimized to meet application end-to-end latency requirements.

Certain embodiments described herein may have various benefits and/or advantages to overcome the disadvantages described above. For example, certain embodiments may enable configuration of HnF buffers in the 5GS to meet deterministic needs of applications when the network does not include a CNC and, hence, no TSN protocols specify a 5GS bridge port gate time. Various embodiments may enable configuration of HnF buffers in the 5GS to meet deterministic needs of applications when the network does not support IEEE TSN protocols (802.1Qcc, 802.1Qbv, and/or 802.1Qci), when the DN is not a layer 2 bridged network, and/or when the 5GS provides direct communication between endpoints without the aid of a DN. Thus, certain embodiments are directed to improvements in computer-related technology.

Described herein are various techniques allowing configuration of HnF buffers for a 5GS in the absence of IEEE TSN protocols used with a 5GS TSN bridge specified in 3GPP Rel-16 for TSC. In general, an AF may request TSC QoS parameters via the NEF exposure framework, causing an assignment of a QoS flow in the 5GS with a maximum data burst volume (MDBV) that must be transported within a packet delay budget (PDB). The AF may also provide TSCAI parameters similar to those defined in 3GPP Rel-16, which may be determined by the AF from end-station requirements or from non-3GPP sources. TSCAI parameters supplied by the AF may include a periodicity for the TSC stream and/or a BAT, which may specify the arrival time of the first data burst at the ingress of the 5GS at the UE for uplink flows or the UPF interface for downlink flows. The TSCAI parameters may be processed by the SMF and used to optimize scheduling in the RAN.

FIG. 1 illustrates an example of a signaling diagram showing communications between UE 120, core 130, UPF 140, and AF 150. UE 120 may be similar to UE 610, core 130 may be similar to core 620, UPF 140 may be similar to UPF 630, and AF 150 may be similar to 640, each illustrated in FIG. 6.

At 101, AF 150 may be configured to transmit to core 130 at least one TSC request. In some embodiments, the at least one TSC request may comprise one or more of at least one TSCAI BAT and at least one TSCAI periodicity indication. For example, the at least one TSCAI BAT may comprise at least one reference to UE 120 and/or at least one reference to UPF 140 ingress, such as N6.

At 103, UE 120 may be configured to transmit to core 130 one or more of at least one residence time associated with UE 120 and at least one wired transmission rate R of UE 120. In some embodiments, 103 may occur in response to 101, for example, during or after a PDU session modification triggered at 101. In various embodiments, 103 may occur before 101, for example, 103 may be part of at least one UE registration or PDU session establishment.

At 105, UE 120 and/or core 130 may be configured to determine one or more of at least one HnF UE buffer parameter and at least one HnF UPF buffer parameter. For example, the at least one HnF UE buffer parameter and the at least one HnF UPF buffer parameter may be HnF_First_Open_Time associated with the at least one TSCAI BAT comprising at least one packet delay between UE 120 and UPF 140.

In some embodiments, the at least one HnF_First_Open_Time buffer parameter may be a summation, in part, of the at least one TSCAI BAT, at least one PDB, and the at least one residence time associated with UE 120. For example, for an uplink flow, such as where the at least one BAT received from AF 150 is associated with at least one UE ingress, HnF_First_Open_Time may be a summation, in part, of the at least one BAT, at least one PDB, and the at least one residence time of UE 120. In certain embodiments, HnF_First_Close_Time may be a summation, in part, of HnF_Open_Time and at least one window, where the at least one window may be determined from at least one maximum data burst volume (MDBV) and/or minimum data burst rate (MDBR), wherein the MDBR may be a transmission rate R of UPF 140 to at least one upstream node, such as at least one endpoint.

In some embodiments, the aforementioned calculations may be performed by UE 120 and/or core 130, for example, by at least one session management function (SMF). Specifically, when UE 120 performs the aforementioned calculations, core 130 may transmit one or more of at least one PDB, at least one MDBV, at least one BAT, and at least one periodicity to UE 120. Alternatively, when core 130 performs the aforementioned calculations, UE 120 may transmit one or more of at least one UE residence time and at least one wired transmission rate R to core 130, which may be configured to respond by calculating and transmitting at least one HnF parameter to UE 120.

In various embodiments, the at least one HnF_First_Close_Time buffer parameter may be a summation, in part, of the at least one HnF_First_Open_Time buffer parameter and at least one window, wherein the at least one window may be a maximum size burst, which may be a MDBV divided by the MDBR. For example, MDBR may be the transmission rate of UE 120 to at least one downstream node, such as at least one endpoint.

At 107, core 130 may be configured to transmit to UE 120, for example, via 3GPP non-access stratum (NAS) signaling, the at least one HnF UE parameter, such as the at least one HnF_First_Open_Time, the at least one HnF_First_Close_Time, and at least one periodicity indication. In some embodiments, UE 120 may be configured to calculate at least one HnF_First_Close_Time based, at least, upon one or more of the received at least one HnF_First_Open_Time, the at least one PDB, the at least one BAT, the at least one window size, the received at least one MDBV or MDBR, and the at least one wired transmission rate R of UE 120. In some embodiments, core 130 may calculate the at least one window size and transmit the calculated at least one window size to UE 120.

At 109, core 130 may be configured to transmit to UPF 140, for example, via signaling over at least one N4 interface, the at least one HnF UPF parameter, such as the at least one HnF_First_Open_Time, the at least one HnF_First_Close_Time, and at least one periodicity indication.

At 111, UE 120 and UPF 140 may be configured to establish at least one periodic deterministic data stream, which may be in an UL and/or a DL direction, and/or may comprise at least one packet.

At 113, UE 120 may be configured to start at least one periodic open/close cycle beginning at the at least one HnF_First_Open_Time, for example, where HnF_First_Open_Time≤current_time≤HnF_First_Close_Time.

In certain embodiments, UE 120 may be configured to store the at least one packet in the at least one HnF buffer if UE 120 receives the at least one packet earlier than the at least one HnF open time. Additionally or alternatively, UE 120 may be configured to not store the at least one packet and/or transmit the at least one packet if UE 120 receives the at least one packet after the at least one HnF close time.

At 115, UPF 140 may be configured to start at least one periodic open/close cycle beginning at the at least one HnF_First_Open_Time, for example, where HnF_First_Open_Time≤current_time≤HnF_First_Close_Time.

Figure 2:
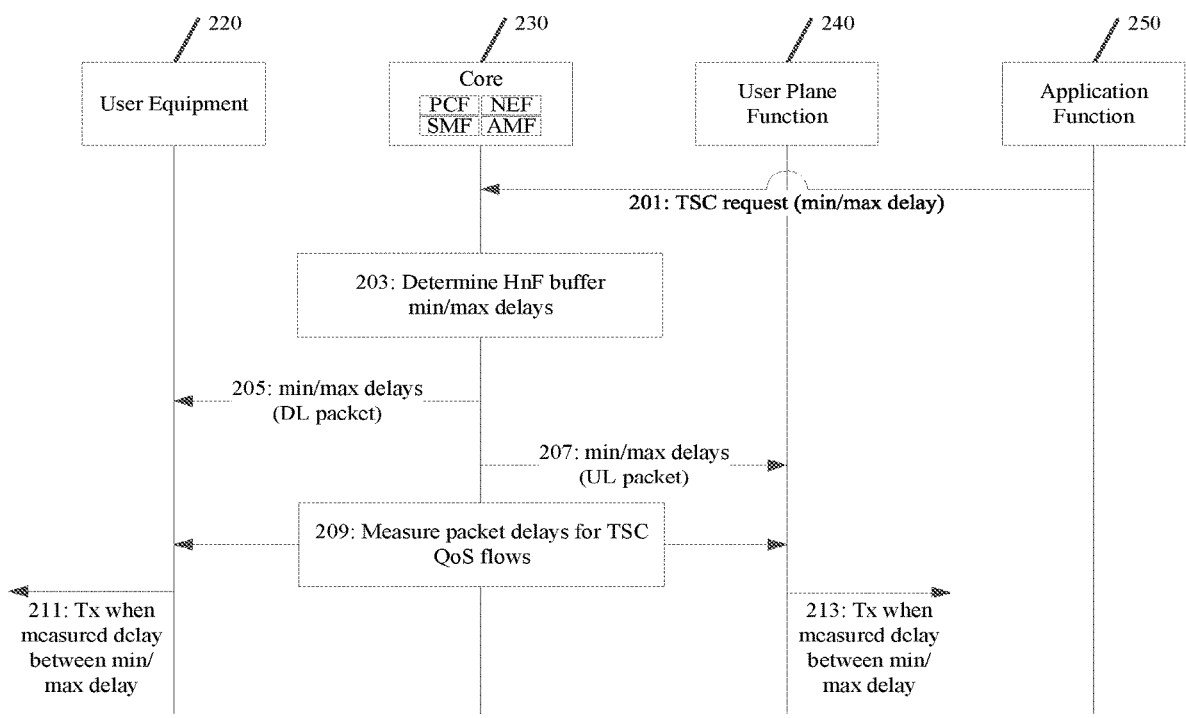
FIG. 2 illustrates another example of a signaling diagram according to certain embodiments.

FIG. 2 illustrates an example of a signaling diagram showing communications between UE 220, core 230, UPF 240, and AF 250. UE 220 may be similar to UE 610, core 230 may be similar to core 620, UPF 240 may be similar to UPF 630, and AF 250 may be similar to 640, each illustrated in FIG. 6.

At 201, AF 250 may be configured to transmit to core 230 at least one TSC request. In some embodiments, the at least one TSC request may comprise at least one request for one or more of at least one maximum delay and at least one minimum delay.

At 203, core 230 may be configured to determine one or more of at least one minimum delay indication configured to be enforced by at least one HnF buffer and at least one maximum delay indication configured to be enforced by the at least one HnF buffer. For example, the determination may be performed by at least one PCF of core 230. Additionally or alternatively, core 230 may be configured to use the at least one maximum delay indication to determine when at least one HnF buffer in UE 220 or UPF 240 allows at least one received packet to be forwarded to a downstream node. Furthermore, core 230 may be configured to use the at least one maximum delay indication to determine when the at least one HnF buffer closes.

At 205, core 230 may be configured to transmit to UE 220, for example, via at least one downlink packet, the one or more of the at least one minimum delay indication configured to be enforced by at least one HnF buffer and the at least one maximum delay indication configured to be enforced by the at least one HnF buffer.

At 207, core 230 may be configure to transmit to UPF 240, for example, via at least one uplink packet, the one or more of the at least one minimum delay indication configured to be enforced by at least one HnF buffer and the at least one maximum delay indication configured to be enforced by the at least one HnF buffer.

At 209, core 230 may be configured to measure at least one packet delay for TSC QoS flow with UE 220 and/or measure at least one packet delay for TSC QoS flow with UPF 240. Upon receipt, UE 220 and/or UPF 240 may be configured to include at least one time stamp, such as at least one PITS, with the at least one respective packet.

At 211, UE 220 may be configured to transmit the at least one packet according to the at least one HnF buffer, for example, when the measured delay is between the minimum delay received from core 230 and maximum delay received from core 230. In some embodiments, the at least one transmission may be performed with at least one PCF of core 230.

At 213, UPF 240 may be configured to transmit the at least one packet according to the at least one HnF buffer, for example, when the measured delay is between the minimum delay received from core 230 and maximum delay received from core 230. In some embodiments, the at least one transmission may be performed with at least one PCF of core 230.

In various embodiments, one or more of at least one deterministic data flow may be established in the UL direction and at least one deterministic data flow may be established in the DL direction. Additionally or alternatively, at least one HnF buffer may be configured to prevent packet transmission before at least one designated transmission time. In some embodiments, 209-213 may be repeated for each packet measured by core 230.

Figure 3:
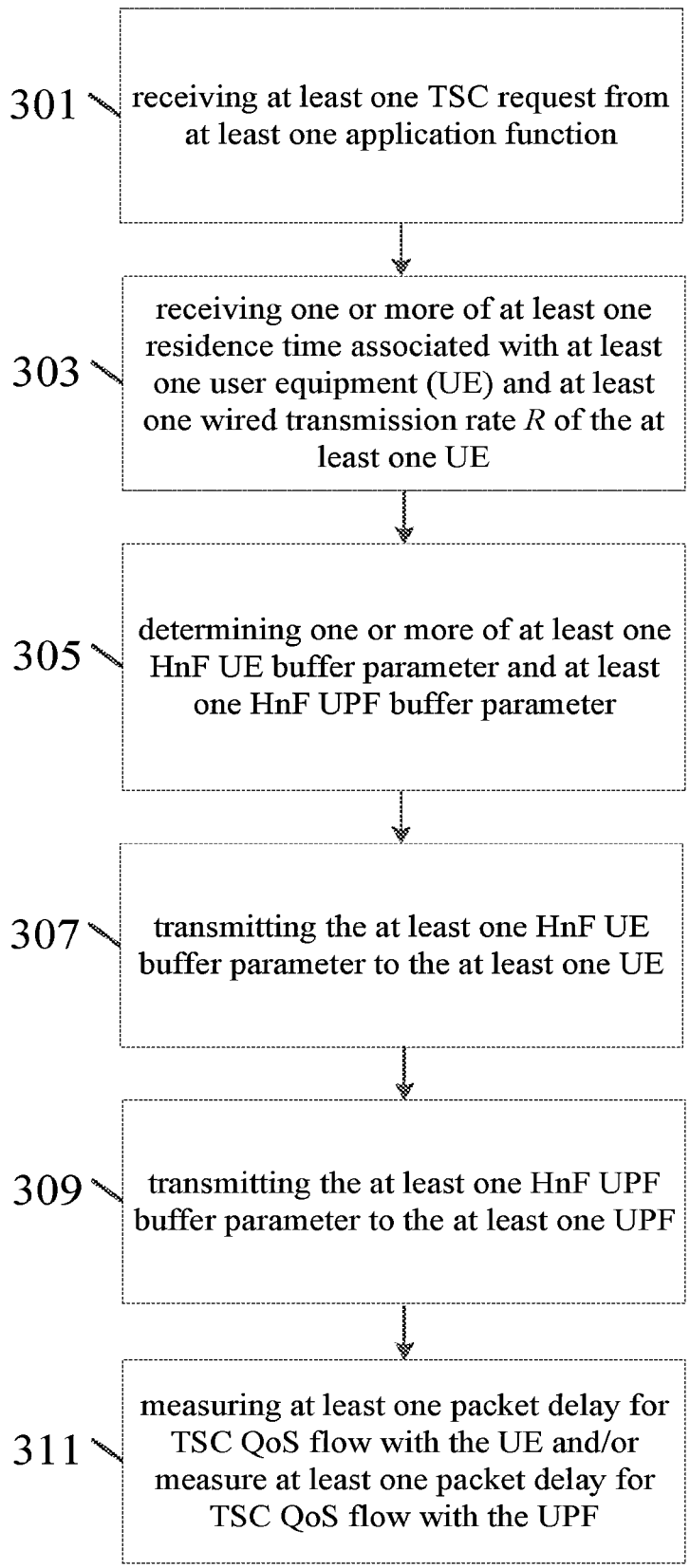
FIG. 3 illustrates an example of a flow diagram of a method according to certain embodiments.
Figure 6:
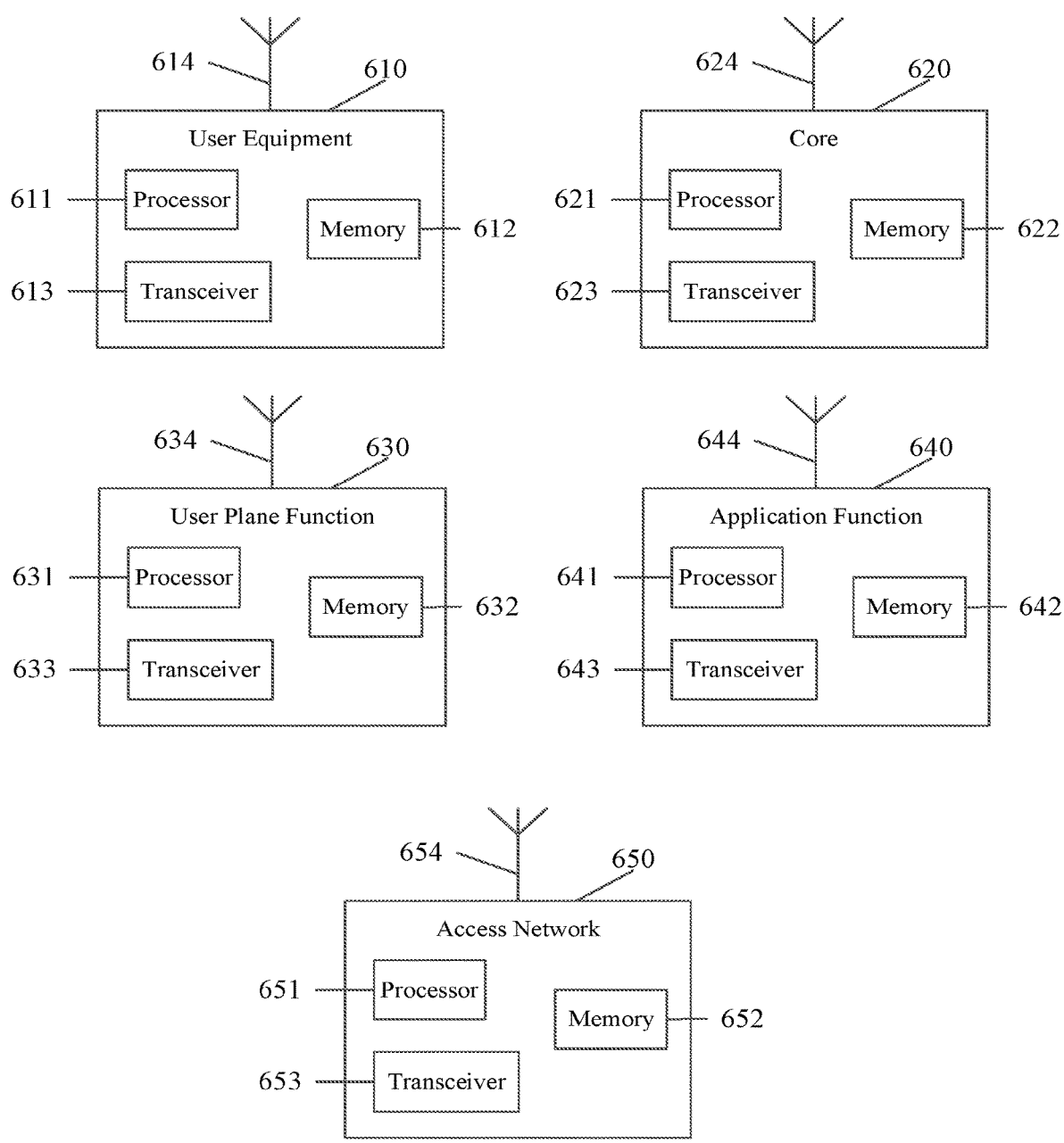
FIG. 6 illustrates an example of various network devices according to certain embodiments.

FIG. 3 illustrates an example of a flow diagram of a method that may be performed by a core, such as core 620 illustrated in FIG. 6, according to certain embodiments.

At 301, at least one TSC request may be received from at least one AF, such as AF 640, as illustrated in FIG. 6.

In some embodiments, the at least one TSC request may comprise one or more of at least one TSCAI BAT and at least one TSCAI periodicity. For example, the at least one TSCAI BAT may comprise at least one reference to at least one UE, such as UE 610 in FIG. 6, and/or at least one reference to a UPF ingress. The at least one TSCAI BAT may be associated with at least one UPF ingress.

In some embodiments, additionally or alternatively, the at least one TSC request may comprise at least one request for one or more of at least one maximum delay and at least one minimum delay.

At 303, zero, one, or more of at least one residence time associated with the UE and at least one wired transmission rate R of the UE may be received from the UE.

At 305, one or more of at least one HnF UE buffer parameter and at least one HnF UPF buffer parameter may be determined.

For example, the at least one HnF UE buffer parameter and the at least one HnF UPF buffer parameter may be similar to HnF_First_Open_Time associated with the at least one TSCAI BAT comprising at least one packet delay between the UE and a UPF, such as UPF 630 in FIG. 6. In some embodiments, the at least one HnF_First_Open_Time buffer parameter may be a summation, in part, of one or more of the at least one TSCAI BAT, at least one PDB, and the at least one residence time associated with the UE. For example, for an uplink, such as where the BAT received from the AF is associated with at least one UE ingress, HnF_First_Open_Time may be a summation, in part, of the at least one BAT, at least one PDB, and the at least one residence time of the UE. In certain embodiments, HnF_First_Close_Time may be a summation, in part, of HnF_Open_Time and at least one window, wherein the at least one window may be at least one MDBV/MDBR, and wherein the at least one MDBR may be a transmission rate R of the UPF to at least one upstream node, such as at least one endpoint. In some embodiments, one or more of the at least one PDB, the at least one MDBV, the at least one BAT, and the at least one periodicity may be at least one HnF buffer parameter, such as at least one HnF UE buffer parameter. Additionally or alternatively, the UE may determine one or more of the at least one HnF_First_Open_Time and the at least one HnF_First_Open_Time.

In various embodiments, the at least one HnF_First_Close_Time buffer parameter may be a summation, in part, of the at least one HnF_First_Open_Time buffer parameter and at least one window, wherein the at least one window may be a maximum size burst, which may be a MDBV, divided by the minimum data rate (MDBR). For example, MDBR may be the transmission rate of the UE to at least one downstream node, such as at least one endpoint.

Additionally or alternatively, one or more of at least one minimum delay indication configured to be enforced by at least one HnF buffer and at least one maximum delay indication configured to be enforced by the at least one HnF buffer may be determined. For example, the determination may be performed by at least one PCF of the core. Additionally or alternatively, the core may use the at least one maximum delay indication to determine when at least one HnF buffer in the UE or the UPF allows at least one received packet to be forwarded to a downstream node. In certain embodiments, the core may use the at least one maximum delay indication to determine when the at least one HnF buffer closes.

At 307, the at least one HnF UE parameter, such as the at least one HnF_First_Open_Time, the at least one HnF_First_Close_Time, and at least one periodicity indication, may be transmitted to the UE, for example, via at least one downlink flow. Additionally or alternatively, the at least one HnF UE parameter transmitted to the UE may be one or more of at least one PDB, at least one MDBV, at least one BAT, and at least one periodicity.

In some embodiments, the one or more of the at least one minimum delay indication configured to be enforced by at least one HnF buffer and the at least one maximum delay indication configured to be enforced by the at least one HnF buffer may be transmitted to the UE, for example, via 3GPP signaling. In some embodiments, the core may configure the UE, which may be performed via NAS signaling over at least one N1 interface. Additionally or alternatively, the core may configure the UPF over at least one N4 interface.

At 309, the at least one HnF UPF parameter, such as the at least one HnF_First_Open_Time, the at least one HnF_First_Close_Time, and at least one periodicity indication, may be transmitted to the UPF, for example, via 3GPP signaling.

In some embodiments, the one or more of the at least one minimum delay indication configured to be enforced by at least one HnF buffer and the at least one maximum delay indication configured to be enforced by the at least one HnF buffer may be transmitted to the UPF, for example, via 3GPP signaling.

At 311, at least one packet delay for TSC QoS flow with the UE and/or at least one packet delay for TSC QoS flow with the UPF may be measured. In some embodiments, 311 may be repeated for each packet received at the UE or core.

Figure 4:
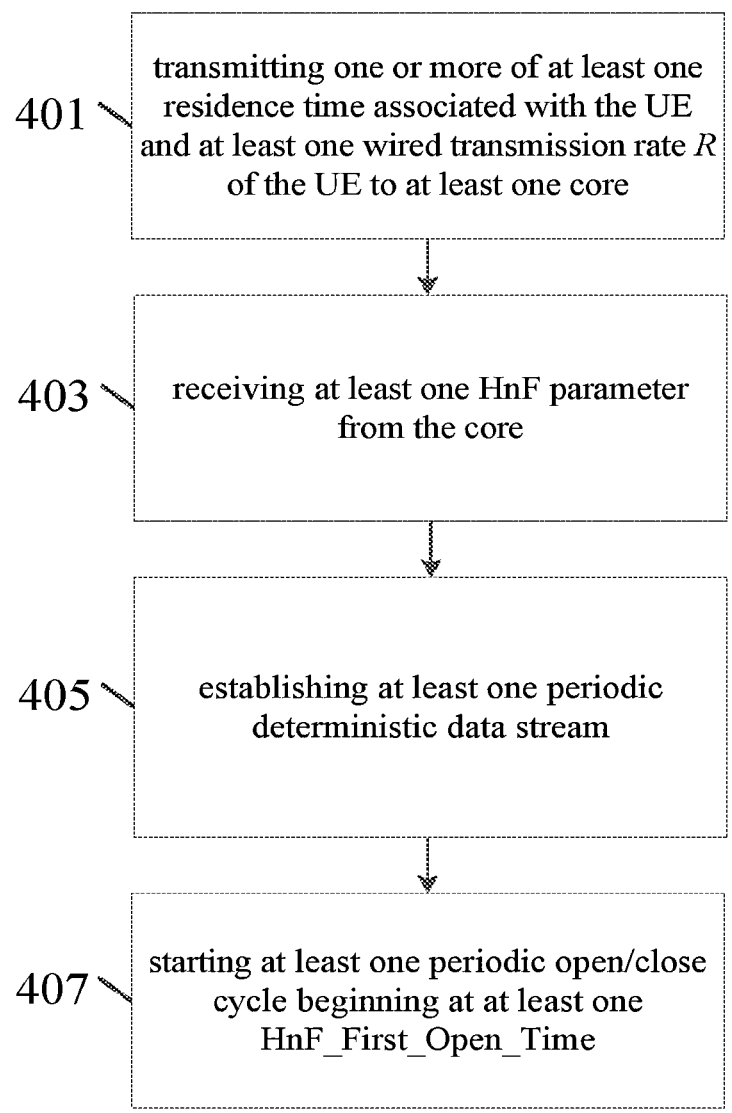
FIG. 4 illustrates another example of a flow diagram of a method according to certain embodiments.

FIG. 4 illustrates an example of a flow diagram of a method that may be performed by a UE, such as UE 610 illustrated in FIG. 6, according to certain embodiments.

At 401, one or more of at least one residence time associated with the UE and at least one wired transmission rate R of the UE may be transmitted to at least one core, such as core 620 illustrated in FIG. 6.

At 403, at least one HnF parameter may be received from the core. In some embodiments, the at least one HnF parameter may comprise at least one HnF UE parameter, such as at least one HnF_First_Open_Time, at least one HnF_First_Close_Time, and at least one periodicity indicator, for example, via at least one downlink flow. Additionally or alternatively, the at least one HnF UE parameter received at the UE may be one or more of at least one PDB, at least one MDBV, at least one BAT, and at least one periodicity.

In certain embodiments, the at least one HnF parameter may comprise one or more of at least one minimum delay indication configured to be enforced by at least one HnF buffer and at least one maximum delay indication configured to be enforced by the at least one HnF buffer may be received from the core, for example, via 3GPP signaling. In various embodiments, the UE may calculate at least one HnF_First_Close_Time based, at least, upon one or more of the received at least one HnF_First_Open_Time, the at least one PDB, the at least one BAT, the received at least one MDBV or MDBR, and the at least one wired transmission rate R of the UE.

At 405, at least one periodic deterministic data stream, which may be in a UL and/or DL direction, and/or may comprise at least one packet, may be established with at least one UPF, such as UPF 630 illustrated in FIG. 6.

At 407, at least one periodic open/close cycle beginning at the at least one HnF_First_Open_Time may be started, for example, where HnF_First_Open_Time≤current_time≤HnF_First_Close_Time.

In certain embodiments, the UE may store the at least one packet in the at least one HnF buffer if the UE receives the at least one packet earlier than the at least one HnF open time. Additionally or alternatively, the UE may not store the at least one packet and/or transmit the at least one packet if the UE receives the at least one packet after the at least one HnF close time.

In some embodiments, the at least one packet may be transmitted according to the at least one HnF buffer, for example, when the measured delay is between the minimum delay received from the core and maximum delay received from the core. In some embodiments, the at least one transmission may be performed with at least one PCF of the core. In some embodiments, 401-407 may be repeated for each packet measured by the core.

Figure 5:
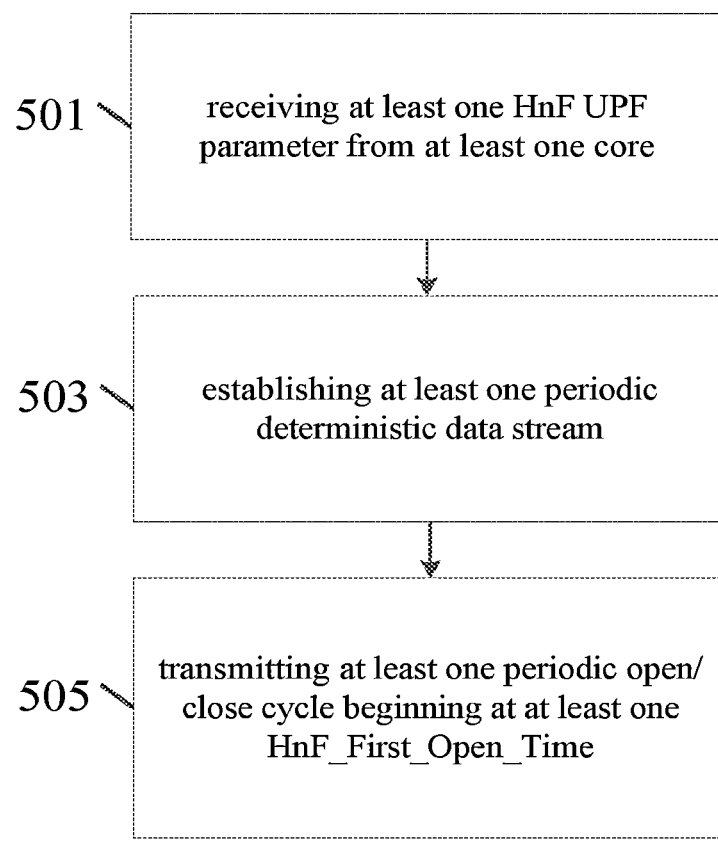
FIG. 5 illustrates another example of a flow diagram of a method according to certain embodiments.

FIG. 5 illustrates an example of a flow diagram of a method that may be performed by a UPF, such as UPF 630 illustrated in FIG. 6, according to certain embodiments.

At 501, at least one HnF UPF parameter, such as at least one HnF_First_Open_Time, at least one HnF_First_Close_Time, and at least one periodicity indicator, may be received, for example, via at least one uplink flow, from at least one core, such as core 620 illustrated in FIG. 6. Alternatively or additionally, one or more of at least one minimum delay indication configured to be enforced by at least one HnF buffer and at least one maximum delay indication configured to be enforced by the at least one HnF buffer may be received from the core, for example, via 3GPP signaling.

At 503, at least one periodic deterministic data stream, which may be in a UL and/or DL direction, and/or may comprise at least one packet, may be established with at least one UE, such as UE 610 illustrated in FIG. 6, according to certain embodiments.

At 505, at least one periodic open/close cycle may begin at at least one HnF_First_Open_Time, for example, where HnF_First_Open_Time≤current_time≤HnF_First_Close_Time. In some embodiments, additionally or alternatively, at least one packet according to the at least one HnF buffer, for example, when the measured delay is between the minimum delay received from the core and maximum delay received from the core, may be transmitted. In some embodiments, the at least one transmission may be performed with at least one PCF of the core.

In various embodiments, one or more of at least one deterministic data flow may be established in the UL direction and at least one deterministic data flow may be established in the DL direction. Additionally or alternatively, at least one HnF buffer may be configured to prevent packet transmission before at least one designated transmission time. In some embodiments, 505 may be repeated for each packet measured by the core, or at each periodic open/close cycle as specified by the at least one periodicity parameter.

FIG. 6 illustrates an example of various network devices according to certain embodiments. In one embodiment, a system may include multiple devices, such as, for example, UE 610, core 620, UPF 630, AF 640, and AN 650. Although only a single UE, core, UPF, AF, and AN are illustrated, a communications network may contain one or more of each of these entities.

UE 610 may include one or more of a mobile device, such as a mobile phone, smart phone, personal digital assistant (PDA), tablet, or portable media player, digital camera, pocket video camera, video game console, navigation unit, such as a global positioning system (GPS) device, desktop or laptop computer, single-location device, such as a sensor or smart meter, or any combination thereof.

Core 620 may be comprised of one or more of at least one AMF, at least one SMF, at least one PCF NEF, at least one UDM, and other network functions specified in 3GPP TS 23.501. Core 620 may interface to at least one access network with one or more of at least one base station, such as an evolved node B (eNB) or next generation node B (gNB), a next generation radio access network (NG RAN), and/or any other access node or combination thereof, which may provide connectivity to UE 610.

UPF 630 may include at least one network function of a network entity, such as core 620 described above. AF 640 may include at least one function associated with at least one application of the communications network, and may provide to and receive from the communications network indications associated with optimizing network traffic, such as data packets. Access network 650 may comprise at least one wireless communications network.

One or more of these entities may include at least one processor, respectively indicated as 611, 621, 631, 641, and 651, respectively. Processors 611, 621, 631, 641, and 651 may be embodied by any computational or data processing device, such as a central processing unit (CPU), application specific integrated circuit (ASIC), or comparable device. The processors may be implemented as a single controller, or a plurality of controllers or processors.

At least one memory may be provided in one or more of entities indicated at 612, 622, 632, 642, and 652, respectively. The memory may be fixed or removable. The memory may include computer program instructions or computer code contained therein. Memories 612, 622, 632, 642, and 652 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate from the one or more processors. Furthermore, the computer program instructions stored in the memory and which may be processed by the processors may be any suitable form of computer program code, for example, a compiled or interpreted computer program written in any suitable programming language.

As shown in FIG. 6, transceivers 613, 623, 633, 643, and 653 may be provided, and one or more entities may also include at least one antenna, respectively illustrated as 614, 624, 634, 644, and 654. One or more transceivers 613, 623, 633, 643, and 653 may be a transmitter, a receiver, or both a transmitter and a receiver, or a unit or device that is configured both for transmission and reception. The device may have many antennas, such as an array of antennas configured for multiple input multiple output (MIMO) communications, or multiple antennas for multiple radio access technologies. Other configurations of these devices, for example, may be provided. For example, UE 610, core 620, UPF 630, AF 640, and AN 650 may additionally or solely be configured for wired communication, and in such a case antennas 614, 624, 634, 644, and 654 would also illustrate any form of communication hardware, without requiring a conventional antenna.

The processors 611, 621, 631, 641, and 651 and memories 612, 622, 632, 642, and 652, or a subset thereof, may be configured to provide means corresponding to the various blocks of FIGS. 1 through 5. Although not shown, the devices may also include positioning hardware, such as global positioning system (GPS) or micro electrical mechanical system (MEMS) hardware, which may be used to determine a location of the device. Other sensors are also permitted and may be included to determine location, elevation, orientation, and so forth, such as barometers, compasses, and the like.

The memory and the computer program instructions may be configured, with the processor for the particular device, to cause a hardware apparatus such as UE 610, core 620, UPF 630, AF 640, and AN 650 to perform any of the processes described above (see, for example, FIGS. 1-5). Therefore, in certain embodiments, a non-transitory computer-readable medium may be encoded with computer instructions that, when executed in hardware, perform a process such as one of the processes described herein. Alternatively, certain embodiments may be performed entirely in hardware.

Furthermore, although FIGS. 1-5 illustrate a system including a UE, core, UPF, AF, and AN, certain embodiments may be applicable to other configurations and/or configurations involving additional elements.

In certain embodiments, an apparatus may include circuitry configured to perform any of the processes or functions illustrated in FIGS. 1-5. For example, circuitry may be hardware-only circuit implementations, such as analog and/or digital circuitry. In another example, circuitry may be a combination of hardware circuits and software, such as a combination of analog and/or digital hardware circuit(s) with software or firmware, and/or any portions of hardware processor(s) with software (including digital signal processor(s)), software, and at least one memory that work together to cause an apparatus to perform various processes or functions. In yet another example, circuitry may be hardware circuit(s) and or processor(s), such as a microprocessor(s) or a portion of a microprocessor(s), that include software, such as firmware for operation. Software in circuitry may not be present when it is not needed for the operation of the hardware.

Figure 7:
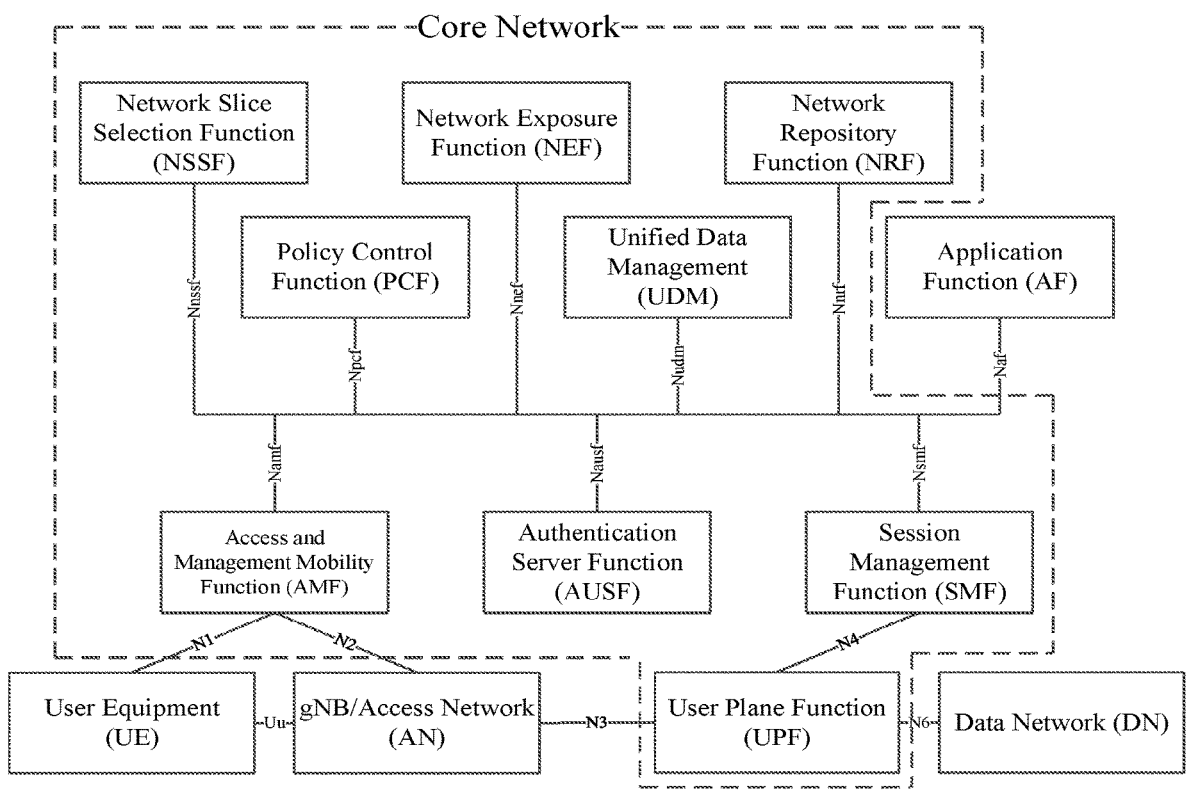
FIG. 7 illustrates an example of a 5G network and system architecture according to certain embodiments.

FIG. 7 illustrates an example of a 5G network and system architecture according to certain embodiments. Shown are multiple network functions that may be implemented as software operating as part of a network device or dedicated hardware, as a network device itself or dedicated hardware, or as a virtual function operating as a network device or dedicated hardware. The UE, core network, UPF, and AF illustrated in FIG. 7 may be similar to UE 610, core 620, UPF 630, and AF 640, respectively. The UPF may provide services such as intra-RAT and inter-RAT mobility, routing and forwarding of data packets, inspection of packets, user plane QoS processing, buffering of downlink packets, and/or triggering of downlink data notifications. The AF may primarily interface with the core network to facilitate application usage of traffic routing and interact with the policy framework.

The features, structures, or characteristics of certain embodiments described throughout this specification may be combined in any suitable manner in one or more embodiments. For example, the usage of the phrases "certain embodiments," "some embodiments," "other embodiments," or other similar language, throughout this specification refers to the fact that a particular feature, structure, or characteristic described in connection with the embodiment may be included in at least one embodiment of the present disclosure. Thus, appearance of the phrases "in certain embodiments," "in some embodiments," "in other embodiments," or other similar language, throughout this specification does not necessarily refer to the same group of embodiments, and the described features, structures, or characteristics may be combined in any suitable manner in one or more embodiments.

One having ordinary skill in the art will readily understand that certain embodiments discussed above may be practiced with procedures in a different order, and/or with hardware elements in configurations which are different than those which are disclosed. Therefore, it would be apparent to those of skill in the art that certain modifications, variations, and alternative constructions would be apparent, while remaining within the spirit and scope of the embodiments of the disclosure. In order to determine the metes and bounds of the embodiments of the disclosure, therefore, reference should be made to the appended claims.

PARTIAL GLOSSARY

3GPP Third Generation Partnership Project
5G Fifth Generation
5GC Fifth Generation Core
5GS Fifth Generation System
5QI Fifth Generation Quality of Service Indicator
AF Application Function
AMF Access Management Function
AN Access Network
ASIC Application Specific Integrated Circuit
BAT Burst Arrival Time
BS Base Station
CNC Centralized Network Controller
CPU Central Processing Unit
DL Downlink
DN Data Network
DS-TT Device Side Time Sensitive Networking Translator
eMBB Enhanced Mobile Broadband
eNB Evolved Node B
EPS Evolved Packet System
gNB Next Generation Node B
GPS Global Positioning System
HDD Hard Disk Drive
HnF Hold and Forward
IEEE Institute of Electrical and Electronics Engineers
IIoT Industrial Internet of Things
LTE Long-Term Evolution
MAC Media Access Control
MCS Modulation and Coding Scheme
MDBV Maximum Data Burst Volume
MDBR Minimum Data Burst Rate
MEMS Micro Electrical Mechanical System
MIMO Multiple Input Multiple Output
MME Mobility Management Entity
NAS Non-Access Stratum
NE Network Entity
NEF Network Exposure Function
NG Next Generation
NR New Radio
NW-TT Network Time Sensitive Networking Translator
PCF Policy Control Function
PDA Personal Digital Assistance
PDB Packet Delay Budget
PDU Protocol Data Unit
PITS Packet Ingress Time Stamp
QoS Quality of Service
R User Equipment/User Plane Function Transmission Rate to an Upstream Node
RAM Random Access Memory
RAN Radio Access Network
SMF Session Management Function
TR Technical Report
TS Technical Specification
TSC Time Sensitive Communications
TSN Time Sensitive Networking
TSCAI Time Sensitive Communications Assistance Information
TSNAI Time Sensitive Networking Assistance Information
Tx Transmit
UDR Unified Data Repository
UE User Equipment
UL Uplink
UPF User Plane Function
URLLC Ultra-Reliable and Low-Latency Communication
WLAN Wireless Local Area Network

The invention claimed is:

1. An apparatus, comprising:
   at least one processor; and
   at least one memory including computer program code,
   wherein the at least one memory and the computer program code are configured to, with the at least one processor, cause the apparatus at least to:
   receive a time sensitive communications (TSC) request an application function (AF), the TSC request including parameters for a TSC stream received from a first TSC device and transmitted to a second TSC device via a communication system in a TSC quality of service (QOS) flow, wherein the communication system is not configured as a time sensitive network (TSN) bridge;
   determine at least one hold and forward (HnF) parameter for a HnF buffer of a second apparatus based at least on the parameters for the TSC stream included in the TSC request; and transmit the at least one HnF parameter for the HnF buffer to the second apparatus for configuring the HnF buffer of the second apparatus, wherein the second apparatus is a user equipment (UE) of the communication system or the second apparatus comprises a user plane function of a core network of the communication system.

2. The apparatus of claim 1, wherein the at least one memory and the computer program code are further configured to, with the at least one processor, cause the apparatus at least to: receive at least one of a residence time associated with the UE and a transmission rate R of the at least one-UE and determine the at least one HnF parameter for the HnF buffer of the second apparatus further based on the residence time and the transmission rate R of the UE.

3. The apparatus of claim 1, wherein the at least one HnF parameter for the HnF buffer comprises an open time for the HnF buffer, a close time for the HnF buffer, and a periodicity indication for the HnF buffer.

4. The apparatus claim 1, wherein the at least one memory and the computer program code are further configured to, with the at least one processor, cause the apparatus at least to:
   measure at least one packet delay for the TSC QOS flow between the UE and the UPF.

5. The apparatus of claim 1, wherein the parameters for the TSC stream included in the TSC request comprise at least one a burst arrival time (BAT) for the TSC stream and a periodicity indication of a periodicity of the TSC stream.

6. The apparatus of claim 1, wherein the parameters for the TSC stream included in the TSC request a minimum delay indication for the communication network and at least one-a maximum delay indication for the communication network, and wherein the at least one HnF parameter for the HnF buffer of the second apparatus comprises a minimum delay for the HnF buffer determined based on the minimum delay indication and a maximum delay for the HnF buffer determined based on the maximum delay indication.

7. A user equipment (UE) comprising:
   at least one processor; and
   at least one memory including computer program code,
   wherein the at least one memory and the computer program code are configured to, with the at least one processor, cause the UE at least to:
   transmit, to a core network of a communication system that is not configured as a time sensitive network (TSN) bridge, a residence time associated with the UE and a transmission rate R of the UE;
   receive, from the core network, at least one HnF parameter for a HnF buffer of the UE determined by the core network;
   configure the HnF buffer of the UE based on the at least one HnF parameter for the HnF buffer; and receive, at the HnF buffer of the UE from a user plane function of the core network, packets of a time sensitive communication (TSC) quality of service flow, the packets of TSC QoS flow comprising data of a periodic deterministic TSC stream.

8. The of claim 7, wherein the at least one HnF parameter comprises an open time for the HnF buffer of the UE, a close time for the HnF buffer, and a periodicity for the HnF buffer, and wherein the at least one memory and the computer program code are further configured to, with the at least one processor, cause the UE at least to:
   start at least one periodic open/close cycle for transmitting the packets of TSC QoS flow from the HnF buffer beginning at the open time for the HnF buffer of the UE and ending at the close time for the HnF buffer.

9. An apparatus, comprising:
   at least one processor; and
   at least one memory including computer program code,
   wherein the at least one memory and the computer program code are configured to, with the at least one processor, cause the apparatus at least to:
   receive at least one hold and forward (HnF) URE parameter for a HnF buffer of the apparatus from at a core network of a communication system that is not configured as a time sensitive network (TSN) bridge;
   configure the HnF buffer of the apparatus based on the at least one HnF parameter for the HnF buffer; receive, at the HnF buffer of the apparatus, packets of a time sensitive communication (TSC) quality of service (QOS) flow, the packets of TSC QoS flow comprising data of a periodic deterministic time sensitive communication (TSC) stream; and
   transmit the packets from the HnF buffer during a periodic open/close cycle for the HnF buffer.

10. The apparatus of claim 9, wherein the the at least one HnF parameter comprises an open time for the HnF buffer, a close time for the HnF buffer, and a periodicity indication for periodic open/close cycle for the HnF buffer.

* * * * *